United States Patent
Kim et al.

(10) Patent No.: US 8,196,695 B2
(45) Date of Patent: Jun. 12, 2012

(54) BRAKE PEDAL DEVICE WITH FUNCTION OF REDUCING COLLISION INJURY

(75) Inventors: Eunsik Kim, Daegu (KR); Sungil Byun, Daegu (KR); Jihun Kim, Daegu (KR)

(73) Assignees: Hyundai Motor Company, Seoul (KR); Kyung Chang Industrial Co., Ltd., Daegu (KR)

( * ) Notice: Subject to any disclaimer, the term of this patent is extended or adjusted under 35 U.S.C. 154(b) by 233 days.

(21) Appl. No.: 12/613,289

(22) Filed: Nov. 5, 2009

(65) Prior Publication Data

US 2010/0140008 A1    Jun. 10, 2010

(30) Foreign Application Priority Data

Dec. 5, 2008  (KR) .................. 10-2008-0122842

(51) Int. Cl.
*B60K 28/10*    (2006.01)
(52) U.S. Cl. .................. 180/274; 74/512; 74/560
(58) Field of Classification Search .................. 180/271, 180/274; 74/512, 514, 560
See application file for complete search history.

(56) References Cited

U.S. PATENT DOCUMENTS

| | | | |
|---|---|---|---|
| 6,176,340 B1 * | 1/2001 | Mizuma et al. | 180/274 |
| 6,418,812 B2 * | 7/2002 | Mizuma et al. | 74/512 |
| 6,810,766 B2 * | 11/2004 | Mizuma | 74/512 |
| 7,494,144 B1 * | 2/2009 | Carr | 280/166 |
| 7,665,565 B2 * | 2/2010 | Tokumo et al. | 180/274 |
| 2003/0019319 A1 * | 1/2003 | Mizuma | 74/560 |
| 2003/0029267 A1 * | 2/2003 | Aoki et al. | 74/560 |
| 2006/0162481 A1 * | 7/2006 | Sato | 74/512 |
| 2007/0137394 A1 * | 6/2007 | Park | 74/512 |

FOREIGN PATENT DOCUMENTS

| | | | |
|---|---|---|---|
| JP | 2000-313319 A | | 11/2000 |
| JP | 2000313319 A | * | 11/2000 |
| KR | 10-2005-0029504 A | | 3/2005 |
| KR | 10-2005-0037756 A | | 4/2005 |
| KR | 10-0657589 B1 | | 12/2006 |

* cited by examiner

*Primary Examiner* — Paul N Dickson
*Assistant Examiner* — Robert A Coker
(74) *Attorney, Agent, or Firm* — Morgan, Lewis & Bockius LLP

(57) ABSTRACT

A brake pedal device of reducing a collision injury in a vehicle, may include a brake pedal including a hitching slot at an end portion thereof, a brake switch bracket, a first portion of which is pivotally coupled to the brake pedal by a hinge shaft, a pedal mounting bracket mounted to a vehicle body, wherein a second portion of the brake switch bracket is pivotally coupled to the pedal mounting bracket by a stopper shaft, wherein the stopper shaft of the pedal mounting bracket and the hitching slot of the brake pedal are selectively coupled to hinder rotation of the brake pedal toward a driver with respect to the hinge shaft when a collision force equal to or greater than a predetermined load is applied to the vehicle, and coupling members coupling the pedal mounting bracket and the brake switch bracket and being decoupled when the collision force is applied to the vehicle.

11 Claims, 8 Drawing Sheets

BRAKE PEDAL DEVICE WITH FUNCTION OF REDUCING COLLISION INJURY

CROSS-REFERENCE TO RELATED APPLICATION

The present application claims priority from, Korean Patent Application Number 10-2008-0122842, filed on Dec. 5, 2008, the entire contents of which are incorporated herein for all purposes by this reference.

BACKGROUND OF THE INVENTION

1. Field of the Invention

The present invention relates to a brake pedal device, and more particularly, to a brake pedal device with a function of reducing a collision injury that is capable of effectively reducing a driver's collision injury due to a brake pedal by counter-rotating the brake pedal to the front of a vehicle distance from a driver when a collision accident of the vehicle occurs.

2. Description of Related Art

In general, a brake device of a vehicle, which is used for decelerating or stopping a driving vehicle, includes a brake pedal device that is pivotably mounted in a vehicle body adjacent to a driver's seat so that a driver can operate by foot, a brake booster that receives and boosts an operating force of the brake pedal device, a hydraulic device including a master cylinder that converts force boosted by the brake booster into oil pressure and supplies the oil pressure, and a brake body that generate a friction braking force by closely contact a drum or a disk which rotates by receiving the oil pressure of the hydraulic device with a pad.

The brake pedal of the brake pedal device is connected to a push rod of the brake booster while is pivotably mounted on a bracket fixed to a vehicle body via a hinge. Therefore, when an engine room is broken, and the vehicle body and the brake booster push in toward a driver when a front collision accident of the vehicle occurs, the brake pedal pushes in toward the driver altogether, thereby inflicting a serious injury upon driver's legs.

Several suggestions were presented in order to prevent the brake pedal from pushing in toward the driver in related art. For example, there was a suggestion in which a deflector member and a stopper are mounted on the brake pedal and a cowl cross member, respectively, to prevent pushing of the brake pedal by an interaction thereof or the hinge is formed in a lower part which the brake booster pushes in and the brake pedal is broken when the booster pushes in to prevent the pushing of the brake pedal.

However, in the related art, the pushing of the brake pedal is not completely hindered when the front collision accident of the vehicle occurs, such that the driver's injury cannot be effectively alleviated or a structure is complicated, such that weight and cost of the vehicle increase.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY OF THE INVENTION

Various aspects of the present invention are directed to provide a brake pedal device with a function of reducing a collision injury that is capable of effectively reducing a driver's collision injury due to a brake pedal by counter-rotating the brake pedal to the front of a vehicle distance from a driver around a hinge shaft when the brake pedal pushes in toward a driver due to occurrence of a front collision accident of the vehicle.

In an aspect of the present invention, in the brake pedal device with a function of reducing a collision injury, a brake pedal may be rotatably installed in a pedal mounting bracket mounted on a vehicle body via a hinge shaft, the hinge shaft may removably fit in a joining slot formed in the pedal mounting bracket, a brake switch bracket with a brake switch may be mounted on the pedal mounting bracket via a stopper shaft, and the stopper shaft may removably fit in an upper mounting bracket fixed to the vehicle body.

A fixing protrusion may be provided in the brake switch bracket and the fixing protrusion removably fits in a joining hole of the pedal mounting bracket, wherein a hitching slot into which the stopper shaft is inserted to hinder rotation of the brake pedal at the time when the brake pedal rotates toward a driver is formed at an upper end of the brake pedal.

The pedal mounting bracket may have a cross-section of a 'ㄷ' shaped channel and includes a joining slot in which the hinge shaft removably fits, a joining hole which the stopper shaft penetrates, joining holes in which the fixing protrusion of the brake switch bracket fits, and a joining hole in which a push rod of a brake booster penetratively fits at each of both flanges of the pedal mounting bracket.

The brake switch bracket may have the cross-section of the 'ㄷ' shaped channel, the fixing protrusion integrally protrudes on the both flanges to the outside, and joining holes which the hinge shaft and the stopper shaft penetrate are formed in the both flanges of the pedal mounting bracket.

The upper mounting bracket may have a shape bent at a predetermined angle, a joining hole for mounting the upper mounting bracket on the vehicle body is provided in an upper part thereof, and joining slots which fit in an outer periphery of the stopper shaft are formed in both lower flanges thereof.

In another aspect of the present invention, a brake pedal device of reducing a collision injury in a vehicle, may include a brake pedal including a hitching slot at an end portion thereof, a brake switch bracket, a first portion of which is pivotally coupled to the brake pedal by a hinge shaft, a pedal mounting bracket mounted to a vehicle body, wherein a second portion of the brake switch bracket is pivotally coupled to the pedal mounting bracket by a stopper shaft, wherein the stopper shaft of the pedal mounting bracket and the hitching slot of the brake pedal are selectively coupled to hinder rotation of the brake pedal toward a driver with respect to the hinge shaft when a collision force equal to or greater than a predetermined load is applied to the vehicle, and coupling members coupling the pedal mounting bracket and the brake switch bracket and being decoupled when the collision force is applied to the vehicle.

The pedal mounting bracket may include a joining slot to selectively receive the hinge shaft.

The brake pedal device may further include an upper mounting bracket mounted to the vehicle body wherein the stopper shaft fits in the upper mounting bracket and removable from the upper mounting bracket when the collision force is applied to the vehicle, wherein the upper mounting bracket has a shape bent at a predetermined angle, a joining hole for mounting the upper mounting bracket on the vehicle body is provided in an upper part thereof, and joining slots which fit in an outer periphery of the stopper shaft are formed in both lower flanges thereof.

The brake switch bracket may include a brake switch disposed in a predetermined position from the stopper shaft.

The coupling members may include a fixing protrusion provided in the brake switch bracket and a joining hole provided in the pedal mounting bracket and the fixing protrusion fits in the joining hole of the pedal mounting bracket and removable therefrom when the collision force is applied to the vehicle, wherein the pedal mounting bracket has a cross-section of 'ㄷ' shaped channel and includes a joining hole in which a push rod of a brake booster penetratively fits at each of both flanges of the pedal mounting bracket, and wherein the brake switch bracket has the cross-section of the 'ㄴ' shaped channel and the fixing protrusion integrally protrudes on both flanges of the brake switch bracket to the outside.

By a brake pedal device with a function of reducing a collision injury according to various aspects of the present invention, when a front collision accident of a vehicle occurs, an engine is pushed to a rear side to blow a brake booster and when a dash panel constituting a vehicle body is also pushed to the rear side, a stopper shaft mounted on a pedal mounting bracket is separated from an upper bracket fixed to the vehicle body due to an impact load applied to the dash panel. Subsequently, as the collision is continuously progressed, a hinge shaft of a brake pedal is separated from the pedal mounting bracket. In this state, in a state in which an upper end of the brake pedal engages in the stopper shaft, the brake pedal counter-rotates to the front distant from a driver around the hinge shaft to effectively reduce a driver's collision injury due to the brake pedal, thereby more securely and completely protecting a driver, it is possible to reduce weight and cost of the vehicle by simplifying a structure, and as a collision impact load increases, a counter-rotation amount of the brake pedal increases, thereby more securely protecting the driver.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

Figure 1:
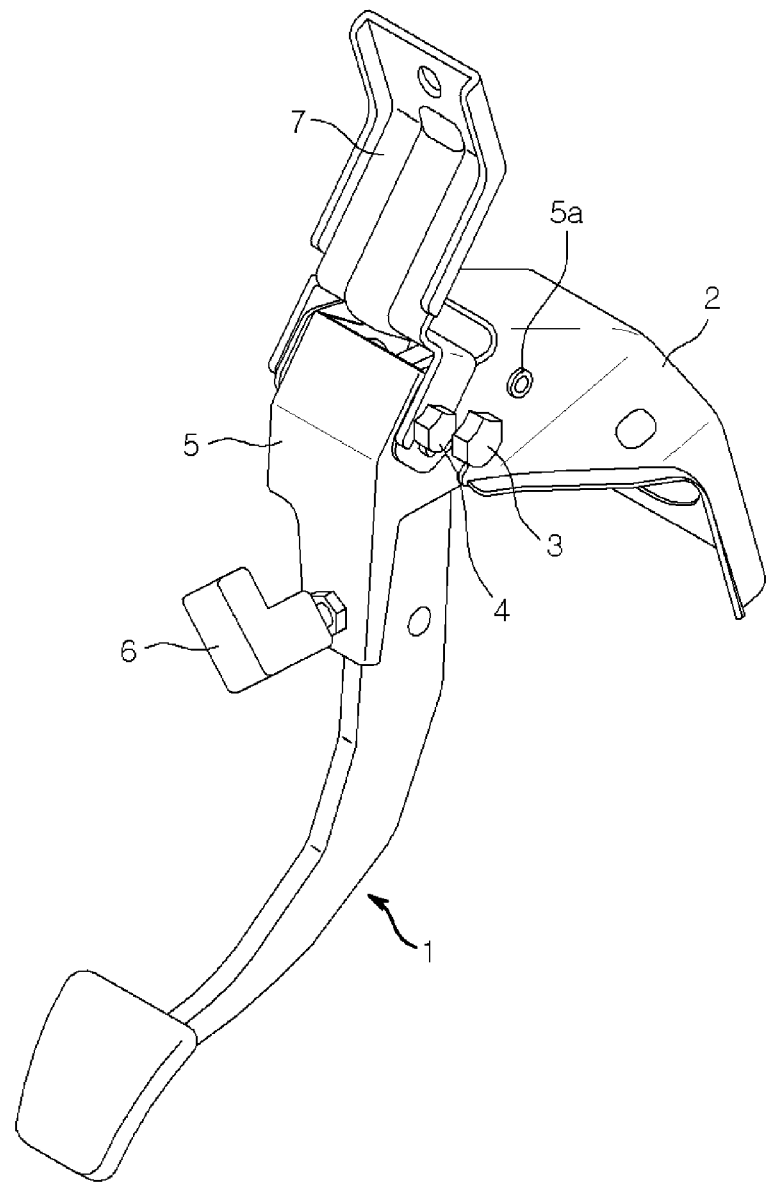
FIG. 1 is a perspective view of a brake pedal device with a function of reducing a collision injury according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION OF THE INVENTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 2:
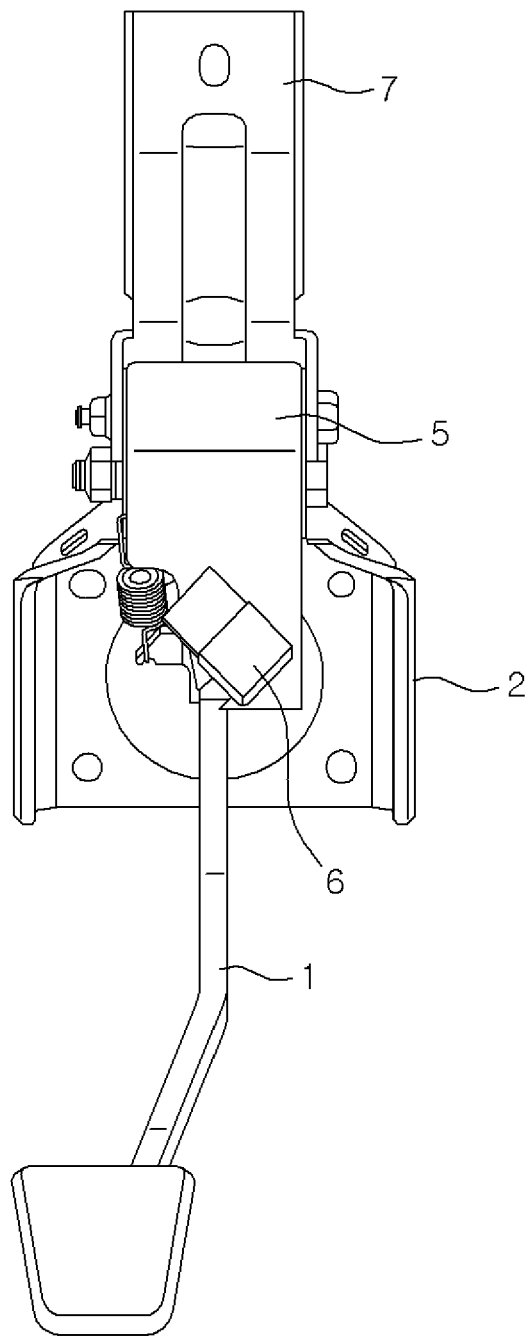
FIG. 2 is a plan view of a brake pedal device with a function of reducing a collision injury according to an exemplary embodiment of the present invention.
Figure 3:
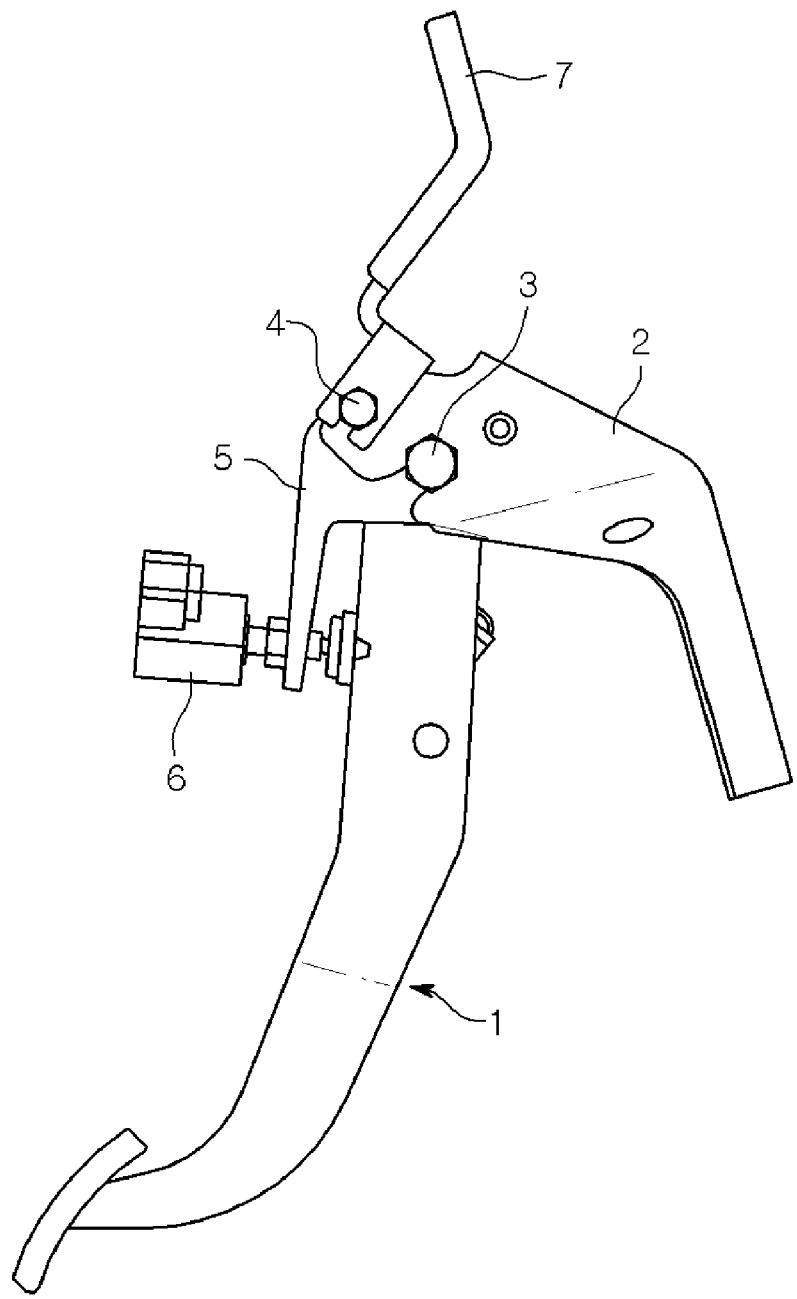
FIG. 3 is a side view of a brake pedal device with a function of reducing a collision injury according to an exemplary embodiment of the present invention.

Referring to FIGS. 1 to 3, a brake pedal 1 is pivotably joined to and supported by a pedal mounting bracket 2 that is fixed and mounted to a vehicle body, via a hinge shaft 3. A stopper shaft 4 is penetratively mounted on pedal mounting bracket 2. Stopper shaft 4 penetrates a brake switch bracket 5 inserted through an opening of pedal mounting bracket 2, such that brake switch bracket 5 is joined to pedal mounting bracket 2 via stopper shaft 4.

A brake switch 6 fits in brake switch bracket 2. An upper mounting bracket 7 fits in an outer periphery of stopper shaft 4 and is fixed to the vehicle body, thereby improving support rigidity of the entire brake pedal device.

A fixing protrusion 5a integrally protrudes on brake switch bracket 5 and fits in an joining hole 2c of pedal mounting bracket 2, such that a rotation moment applied to brake switch bracket 5 by the bracket pedal at the time of operating brake pedal 1 is distributed and supported to pedal mounting bracket 2.

Figure 4:
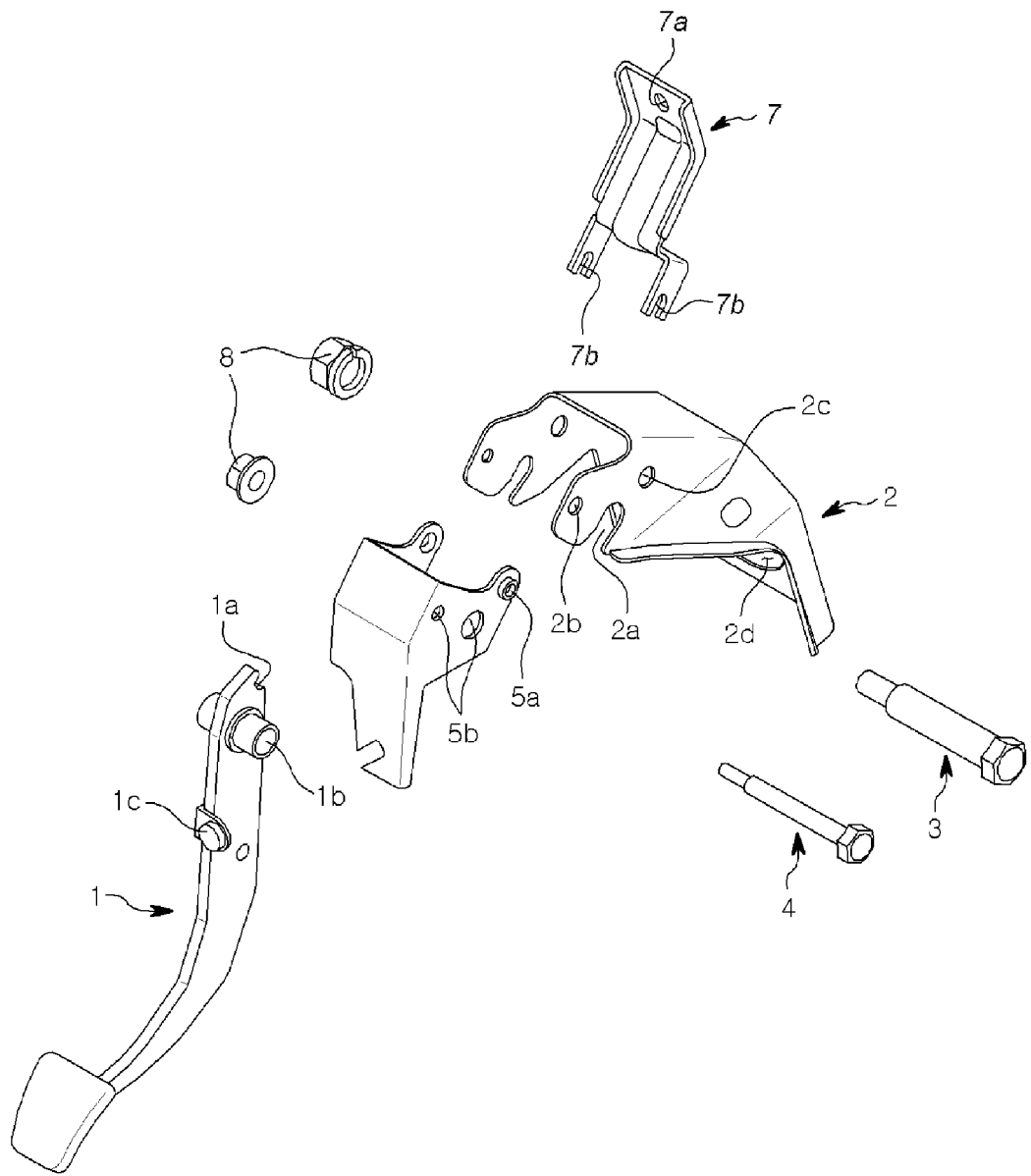
FIG. 4 is an exploded perspective view of a brake pedal device with a function of reducing a collision injury according to an exemplary embodiment of the present invention.

Referring to FIG. 4, a concave hitching slot 1a is formed at an upper end of a pedal arm of brake pedal 1. A bush 1b mounted to penetrate the pedal arm fits in an outer periphery of a hinge shaft 3 and supports the pedal arm to rotate brake pedal 1 around hinge shaft 3. An operating protrusion 1c for operating brake switch 6 is installed at a predetermined portion of the pedal arm.

Figure 5:
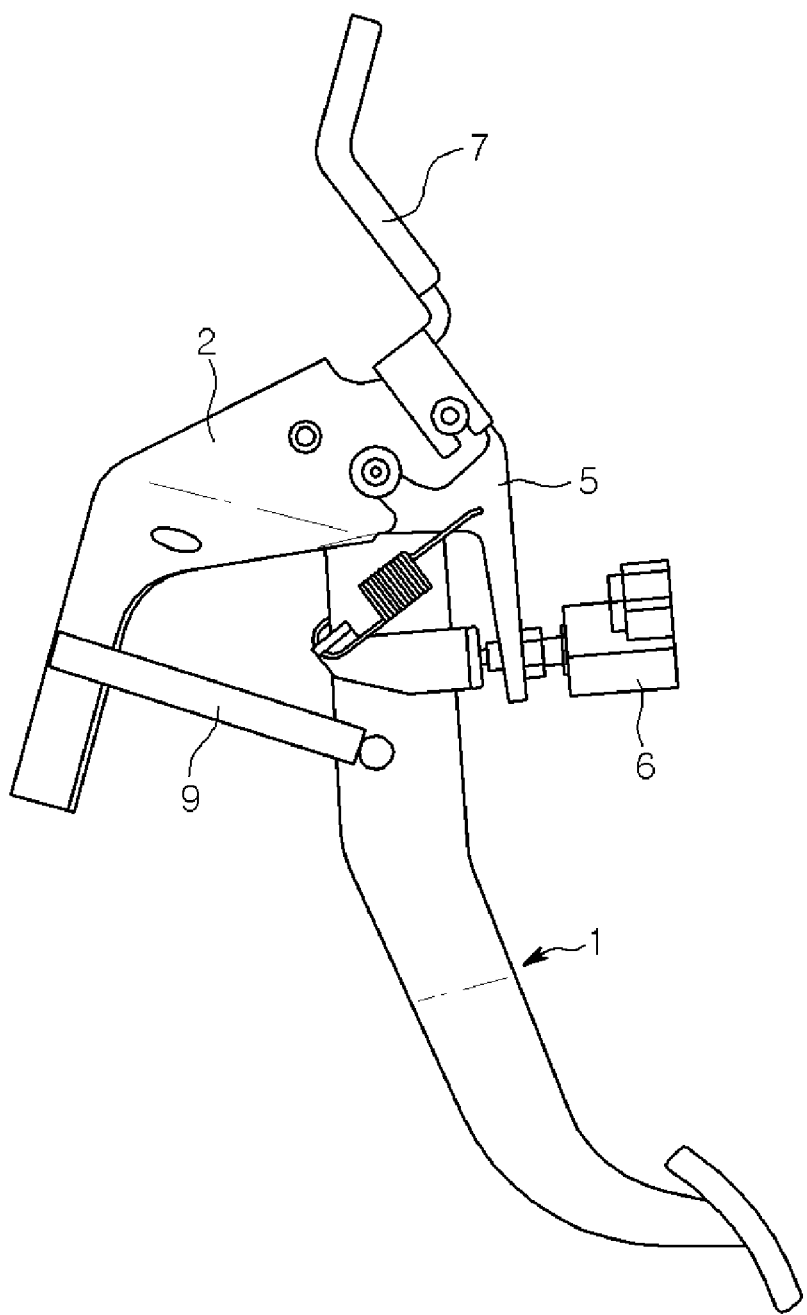
FIG. 5 is a side view of a brake pedal device with a function of reducing a collision injury before collision according to an exemplary embodiment of the present invention.

Pedal mounting bracket 2 having a cross section of a 'ㄷ' shaped channel shape includes a joining slot 2a in which hinge shaft 3 removably fits, a joining hole 2b which stopper shaft 4 penetrates, a joining hole 2c in which a fixing protrusion 5a of brake switch bracket 5 fits, and a joining hole 2d which a push rod 9 of a brake booster shown in FIG. 5 penetrates and fits in at each of both front flanges thereof.

Hinge shaft 3 and stopper shaft 4 are formed by bolts and joined via nuts 8.

Brake switch bracket 5 has the cross-section of the 'ㄴ' shaped channel shape. Fixing protrusion 5a integrally protrudes on front ends of the both flanges to the outside and joining holes 5b which hinge shaft 3 and stopper shaft 4 penetrate are formed in the both flanges.

Upper mounting bracket 7 is bent at a predetermined angle. A joining hole 7a for mounting on the vehicle body is provided in an upper part of upper mounting bracket 7 and joining slots 7b that fit in the outer periphery of stopper shaft 4 are formed in flanges formed in a lower part of upper mounting bracket 7.

FIG. 5 is a side view of a state in which a brake pedal device having the above-mentioned structure is pivotably supported in a vehicle body via a pedal mounting bracket and an upper mounting bracket according to an exemplary embodiment of the present invention. Push rod 9 of the brake booster penetrates and fits in joining hole 2d of pedal mounting bracket 2 and is integrally connected and interworked with brake pedal 1.

Figure 6:
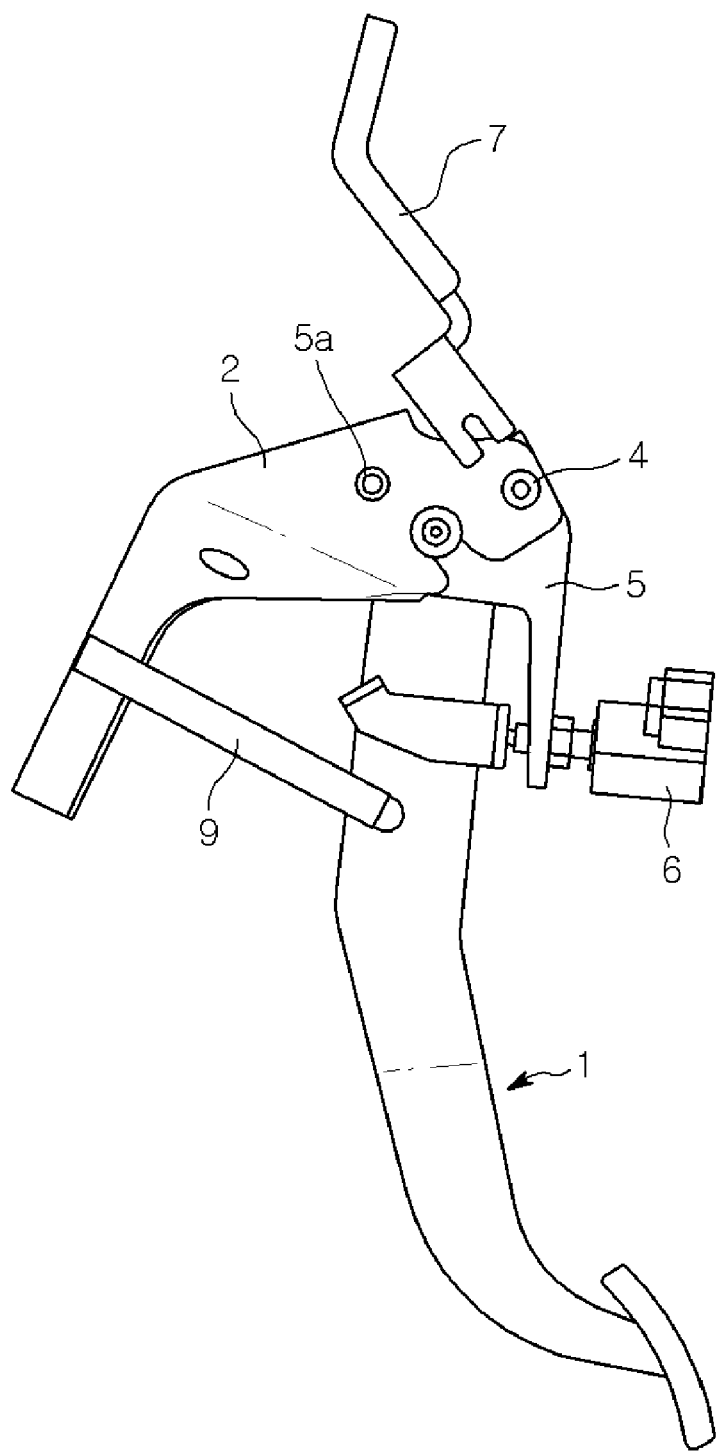
FIGS. 6 to 8 are diagrams illustrating an operation of a brake pedal device with a function of reducing a collision injury after collision according to an exemplary embodiment of the present invention.

When a collision accident occurs in the vehicle of the above-mentioned state, stopper shaft 4 is removed from upper mounting bracket 7 due to an impact load of the vehicle body (dash panel) as shown in FIG. 6.

Figure 7:
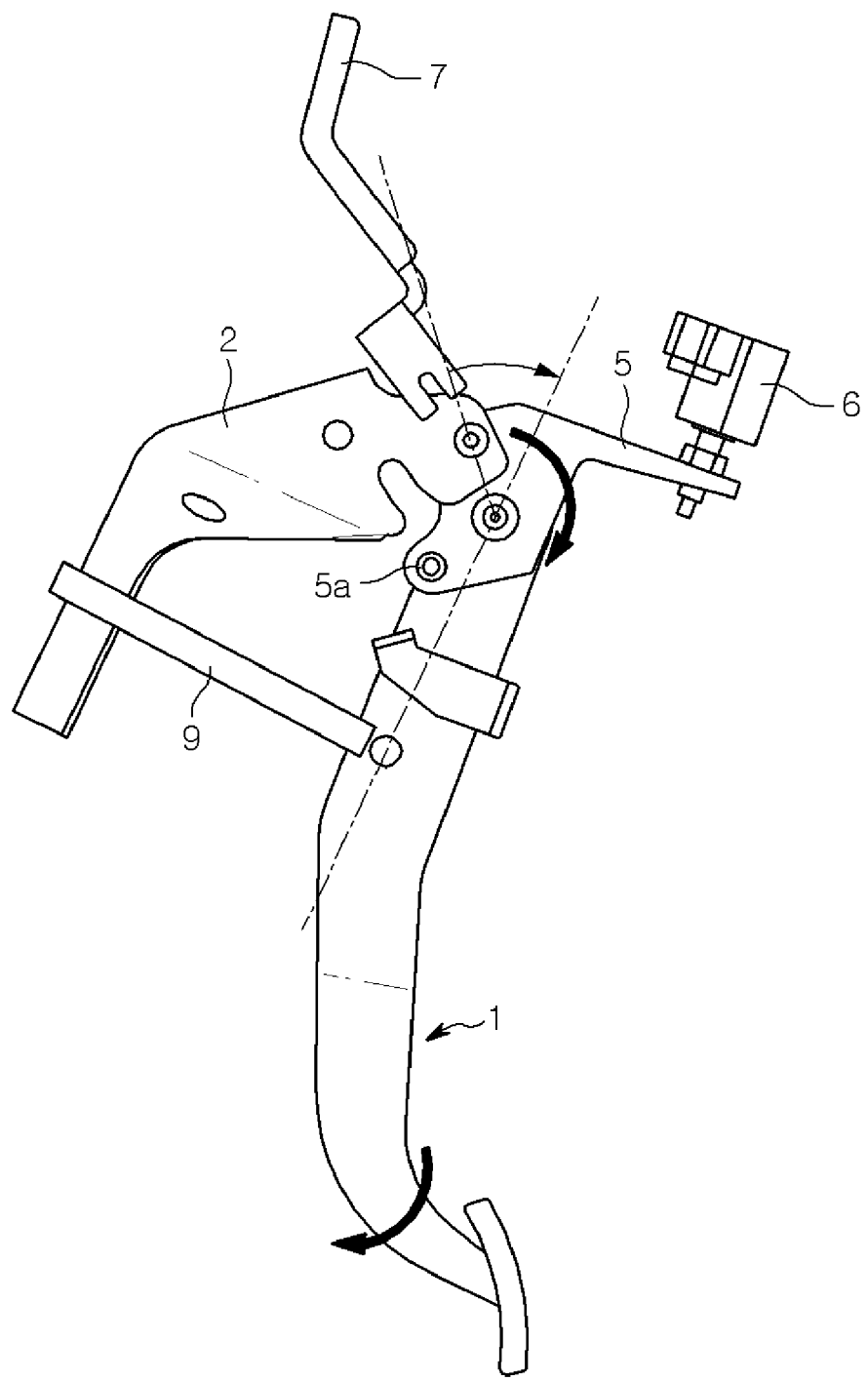

When the collision is continuously progressed, fixing protrusion 5a is removed from pedal mounting bracket 2 and hinge shaft 3 is removed from the joining slot 2a of pedal mounting bracket 2 while fixing protrusion 5a of a brake switch bracket 5 is deformed as shown in FIG. 7.

Furthermore, due to the collision force, the brake switch bracket 5 including brake switch 6 may rotate in a counterclockwise direction in FIG. 7 such that the stopper shaft 4 is inserted into hitching slot 1a formed at an upper end of the brake pedal 1 while the brake pedal 1 is pivoted by the rotation of the brake switch bracket 5.

Figure 8:
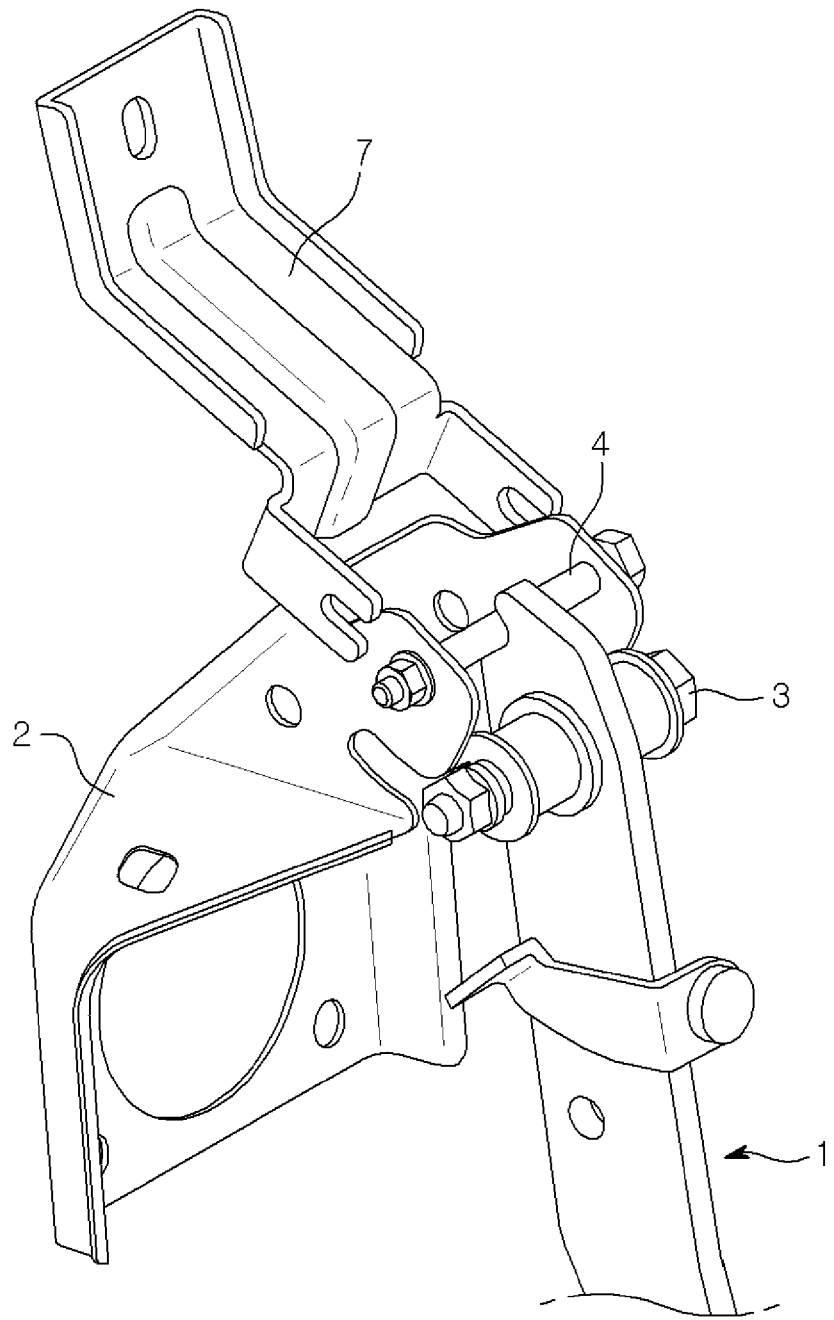

In this state, when brake pedal 1 is pushed toward a driver, the brake pedal 1 is not pushed toward the driver as shown in FIG. 8 since while an impact force is transmitted to brake pedal 1 from the pedal mounting bracket, a rotation moment is applied to brake pedal 1 around hinge shaft 3 and brake pedal 1 rotates to the front of the vehicle distant from the driver in a counterclockwise direction around hinge shaft 3. Therefore, it is possible to effectively reduce the driver's collision injury.

Of course, hitching slot 1a of the brake pedal is separated from stopper shaft 4 by a predetermined distance before the collision occurs and stopper shaft 4 is inserted into hitching slot 1a only when the brake pedal rotates toward the driver by occurrence of the collision.

Meanwhile, as a push amount of the pedal mounting bracket increases due to stronger collision, a counter-rotating angle of the brake pedal increases, thereby more effectively reducing the driver's collision injury.

For convenience in explanation and accurate definition in the appended claims, the terms "upper" and "lower" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A brake pedal device for reducing a collision injury, comprising:
    a brake pedal releasably installed in a pedal mounting bracket mounted on a vehicle body;
    a hinge shaft removably received in a first joining slot formed in the pedal mounting bracket, wherein the brake pedal is pivotally mounted to the pedal mounting bracket when the hinge shaft is located in the first joining slot;
    a brake switch bracket supporting a brake switch and pivotally mounted on the pedal mounting bracket;
    a stopper shaft removably received in an upper mounting bracket fixed to the vehicle body;
    a fixing protrusion provided in the brake switch bracket that releasably locates the brake switch bracket in a first joining hole of the pedal mounting bracket; and
    a hitching slot formed in an upper end of the brake pedal engaging the stopper shaft to hinder rotation of the brake pedal during collision as the brake pedal rotates toward a driver.

2. The device as defined in claim 1, wherein the pedal mounting bracket has a cross-section of a ' ⊏ ' shaped channel and includes the first joining slot in which the hinge shaft removably fits, a second joining hole into which the stopper shaft penetrates, and a third joining hole in which a push rod of a brake booster penetratively fits at each of both flanges of the pedal mounting bracket.

3. The device as defined in claim 1, wherein the brake switch bracket has a cross-section of a ' ⊏ ' shaped channel, the fixing protrusion integrally protrudes on both flanges thereof to the outside, and fourth joining holes which the hinge shaft and the stopper shaft penetrate respectively are formed in the both flanges of the pedal mounting bracket.

4. The device as defined in claim 1, wherein the upper mounting bracket has a shape bent at a predetermined angle, a fifth joining hole for mounting the upper mounting bracket on the vehicle body is provided in an upper part thereof, and second joining slots which fit in an outer periphery of the stopper shaft are formed in both lower flanges thereof.

5. A brake pedal device of reducing a collision injury in a vehicle, comprising:
    a brake pedal including a hitching slot at an end portion thereof;
    a brake switch bracket, a first portion of which is pivotally coupled to the brake pedal by a hinge shaft;
    a pedal mounting bracket mounted to a vehicle body, wherein a second portion of the brake switch bracket is pivotally coupled to the pedal mounting bracket by a stopper shaft, wherein the stopper shaft of the pedal mounting bracket and the hitching slot of the brake pedal are selectively coupled to hinder rotation of the brake pedal toward a driver with respect to the hinge shaft when a collision force equal to or greater than a predetermined load is applied to the vehicle; and
    coupling members coupling the pedal mounting bracket and the brake switch bracket and being decoupled when the collision force is applied to the vehicle;
    wherein the coupling members include a fixing protrusion provided in the brake switch bracket and a first joining hole provided in the pedal mounting bracket;
    wherein the fixing protrusion is releasably received in the first joining hole of the pedal mounting bracket to release therefrom during collision of the vehicle.

6. The device as defined in claim 5, wherein the pedal mounting bracket includes a first joining slot to selectively receive the hinge shaft.

7. The device as defined in claim 5, further comprising an upper mounting bracket mounted to the vehicle body wherein the stopper shaft fits in the upper mounting bracket and removable from the upper mounting bracket when the collision force is applied to the vehicle.

8. The device as defined in claim 7, wherein the upper mounting bracket has a shape bent at a predetermined angle, a second joining hole for mounting the upper mounting bracket on the vehicle body is provided in an upper part thereof, and second joining slots which fit in an outer periphery of the stopper shaft are formed in both lower flanges thereof.

9. The device as defined in claim 5, wherein the brake switch bracket includes a brake switch disposed in a predetermined position from the stopper shaft.

10. The device as defined in claim 5, wherein the pedal mounting bracket has a cross-section of a 'ㄷ' shaped channel and includes a third joining hole in which a push rod of a brake booster penetratively fits at each of both flanges of the pedal mounting bracket.

11. The device as defined in claim 5, wherein the brake switch bracket has a cross-section of a 'ㄷ' shaped channel and the fixing protrusion integrally protrudes on both flanges of the brake switch bracket to the outside.

\* \* \* \* \*